United States Patent
Zhong et al.

(10) Patent No.: US 11,391,324 B1
(45) Date of Patent: Jul. 19, 2022

(54) CREEP MITIGATION DESIGN FOR BEARING ASSEMBLY

(71) Applicant: Schaeffler Technologies AG & Co. KG, Herzogenaurach (DE)

(72) Inventors: Guihui Zhong, Charlotte, NC (US); Marion Jack Ince, Mount Holly, NC (US); Venkata Kottapalli, Fort Mill, NC (US); Arjun Kailassh Magalingam Adithyan, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/224,645

(22) Filed: Apr. 7, 2021

(51) Int. Cl.
*F16C 33/58* (2006.01)
*F16C 35/06* (2006.01)
*F16C 35/067* (2006.01)
*F16C 19/06* (2006.01)

(52) U.S. Cl.
CPC ............ *F16C 33/585* (2013.01); *F16C 19/06* (2013.01); *F16C 35/067* (2013.01)

(58) Field of Classification Search
CPC ...... F16C 19/06; F16C 19/166; F16C 33/583; F16C 33/585; F16C 33/586; F16C 35/063; F16C 35/067
See application file for complete search history.

(56) References Cited

U.S. PATENT DOCUMENTS

| 5,028,152 | A | | 7/1991 | Hill et al. |
| 5,785,433 | A | * | 7/1998 | Takahashi ............. F16C 35/067 384/537 |
| 6,056,445 | A | * | 5/2000 | Ueno .................... F16C 35/067 384/537 |
| 6,129,455 | A | * | 10/2000 | Galante .................... F16C 9/02 384/537 |
| 8,684,608 | B2 | | 4/2014 | Ince et al. |
| 10,612,595 | B2 | | 4/2020 | Zhong et al. |
| 10,662,998 | B2 | | 5/2020 | Zhong |
| 2009/0080824 | A1 | | 3/2009 | Joki et al. |
| 2012/0093453 | A1 | | 4/2012 | Horvat |

FOREIGN PATENT DOCUMENTS

| DE | 19809352 | A1 | * | 10/1998 | ............. F16C 19/52 |
| DE | 102017106330 | A1 | * | 10/2017 | ............. F16C 19/06 |
| JP | 3919067 | B2 | | 7/2002 | |
| JP | 2003239955 | A | * | 8/2003 | |
| JP | 2004028285 | A | * | 1/2004 | |
| JP | 2005195108 | A | * | 7/2005 | ............. F16C 33/586 |
| JP | 2007092863 | A | * | 4/2007 | ............. F16C 33/586 |

(Continued)

*Primary Examiner* — Phillip A Johnson
(74) *Attorney, Agent, or Firm* — Volpe Koenig

(57) ABSTRACT

An improved arrangement and method for preventing bearing ring creep is disclosed herein. The method includes providing a bearing ring including a radial surface having at least one spiral groove. The at least one groove has edge breaks connecting lateral sides to the radial surface of the bearing ring. The method includes arranging the bearing ring inside of a housing or around a shaft such that the radial surface of the bearing ring is arranged adjacent to an inner surface of the housing or an outer surface of the shaft. The edge breaks of the bearing ring frictionally engage with the shaft or the housing to prevent creep of the bearing ring.

21 Claims, 10 Drawing Sheets

(56) References Cited

FOREIGN PATENT DOCUMENTS

| JP | 2007211865 | A | * | 8/2007 | | |
| JP | 2009008202 | A | * | 1/2009 | ............ | F16C 35/067 |
| JP | 2014005897 | A | * | 1/2014 | ............ | F16C 33/783 |
| JP | 2014016014 | A | * | 1/2014 | ............ | F16C 35/067 |
| JP | 2014088925 | A | * | 5/2014 | ............ | F16C 33/586 |
| JP | 2014163485 | A | * | 9/2014 | | |

* cited by examiner

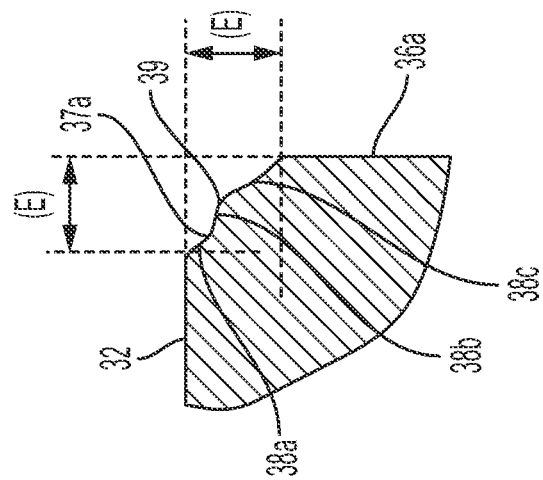
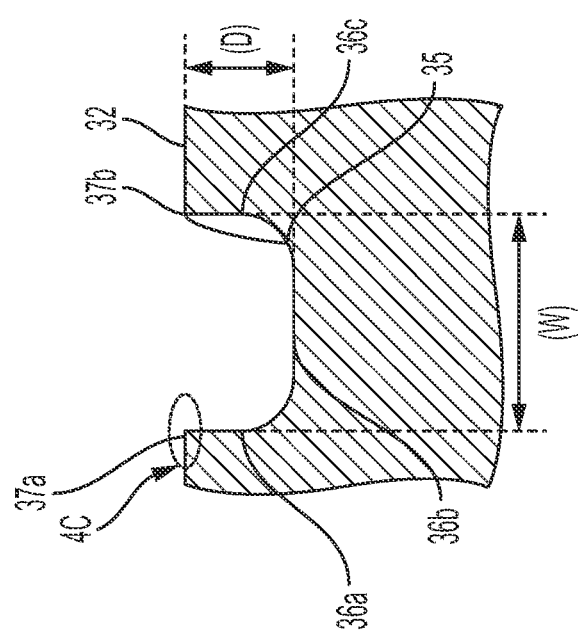
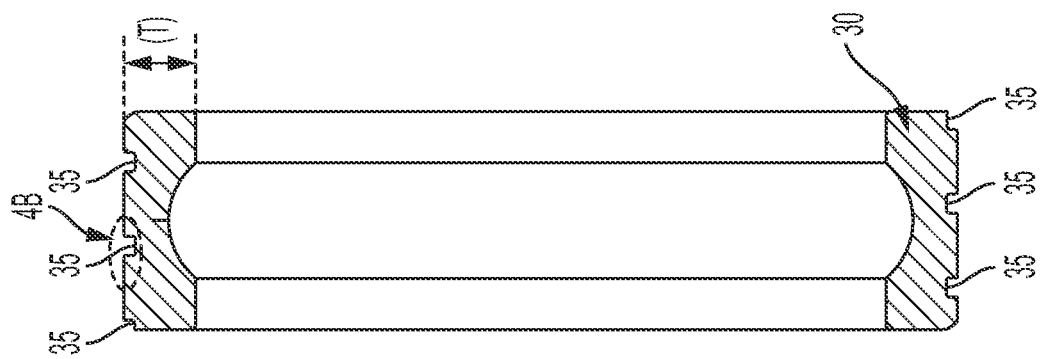
FIG. 4C
FIG. 4B
FIG. 4A

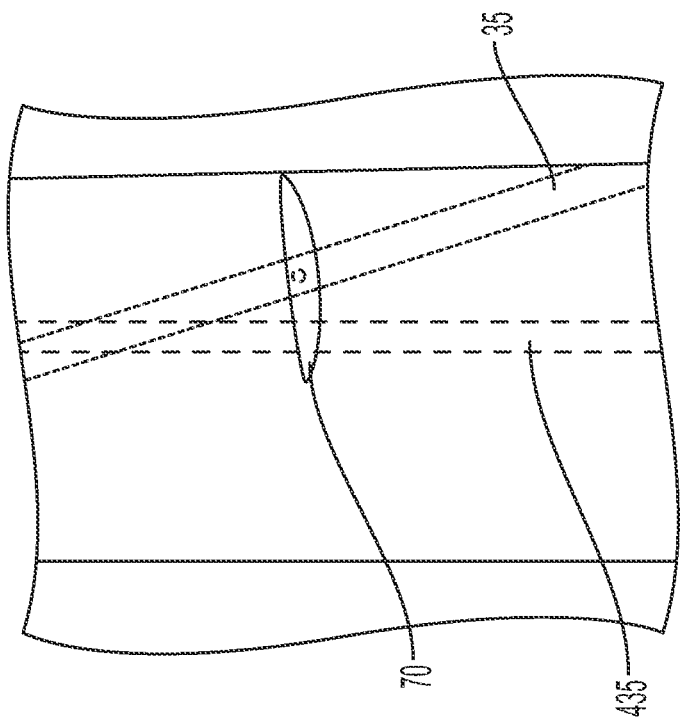
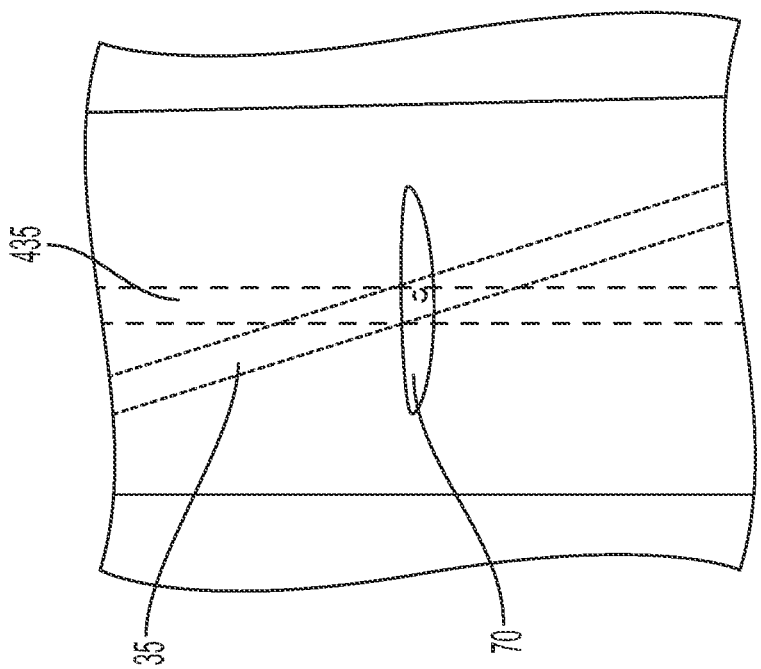

CREEP MITIGATION DESIGN FOR BEARING ASSEMBLY

FIELD OF INVENTION

The present disclosure relates to a bearing assembly, and is more particularly related to addressing creep in a bearing assembly.

BACKGROUND

Bearing assemblies, and in particular deep groove ball bearings (DGBB), experience creep which results in one of the bearing rings rotating slightly. DGBB are used in a variety of applications, such as automotive transmissions, continuously variably transmissions (CVT), hybrid transmission, or e-axle applications. Undesirable movement or creep can be caused by a variety of application conditions including heavy loading, or by variations in the clearance fit due to operating temperatures of the bearing assembly. As a result, based on how the DGBB is used in the application, the outer housing or the shaft experiences fretting or wear. Known solutions for addressing creep include applying an expensive coating, using a thick inner/outer ring, or using an angular contact ball bearing with a special pre-load spring device. These known solutions are expensive.

There is a general desire to provide a bearing assembly that addresses creep in an effective way that is economically viable and can work within the existing space constraints and avoids expensive or time-consuming manufacturing steps.

SUMMARY

The present disclosure provides an improved design for preventing bearing ring creep. In one aspect, a method for preventing creep of a bearing ring in a bearing assembly is disclosed. The method includes providing a bearing ring including a radial surface having at least one groove. The at least one groove has a profile including lateral sides, a base extending between the lateral sides, and edge breaks connecting the lateral sides to the radial surface. The method includes arranging the bearing ring inside of a housing or around a shaft such that the radial surface of the bearing ring is arranged adjacent to an inner surface of the housing or an outer surface of the shaft. The edge breaks of the bearing ring frictionally engage with the inner surface of the housing or the outer surface of the shaft to prevent creep of the bearing ring. The at least one groove can be formed as a spiral groove.

The method can further include aligning the at least one groove with a contact zone defined between the bearing ring and the housing or the shaft, in one embodiment.

In one aspect, the edge breaks have an extent of 0.05 mm-0.15 mm. The at least one groove can have a depth that is less than 50% of a thickness of the bearing ring.

The edge breaks can include a protrusion in a medial region.

In one aspect, the housing or the shaft is formed from metal, and more specifically from aluminum.

In one embodiment, creep of the bearing ring is less than 0.001 RPM during a running condition.

A bearing assembly is also disclosed herein. The bearing assembly includes a bearing ring including a radial surface including at least one groove. The at least one groove has a profile comprising lateral sides, a base extending between the lateral sides, and edge breaks connecting the lateral sides to the outer surface. The assembly includes an outer housing or an inner shaft, and the bearing ring is arranged inside of the outer housing or around the inner shaft.

The at least one groove overlaps with a contact zone between the bearing ring and the outer housing or the inner shaft.

In one aspect, the edge breaks have a profile consisting of a first concave region connected to the outer surface, a convex portion adjacent to the first concave region, and a second concave region adjacent to the convex portion that connects to a respective one of the lateral sides.

Additional embodiments described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 4A is a side cross-sectional view of the outer ring.

FIG. 4B is a magnified view of the outer ring in the area "4B" from FIG. 4A.

FIG. 4C is a further magnified view of the specific area "4C" from FIG. 4B.

FIG. 11A illustrates a contact zone for a bearing assembly in a radially loaded condition.

FIG. 11B illustrates a contact zone for a bearing assembly in a combined axially and radially loaded condition.

DETAILED DESCRIPTION

Figure 1:
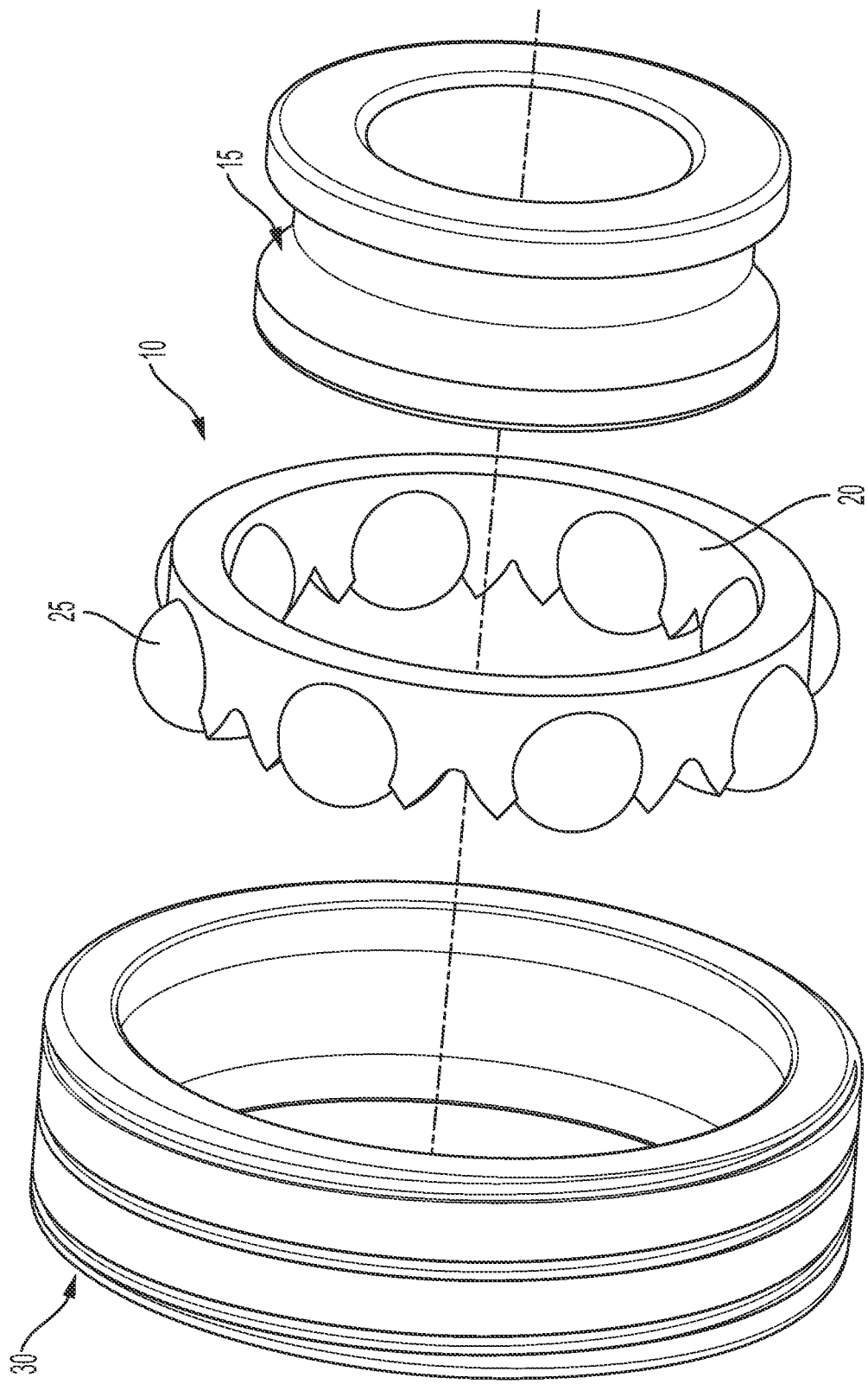
FIG. 1 is a perspective exploded view of a bearing assembly according to one aspect.
Figure 2A:
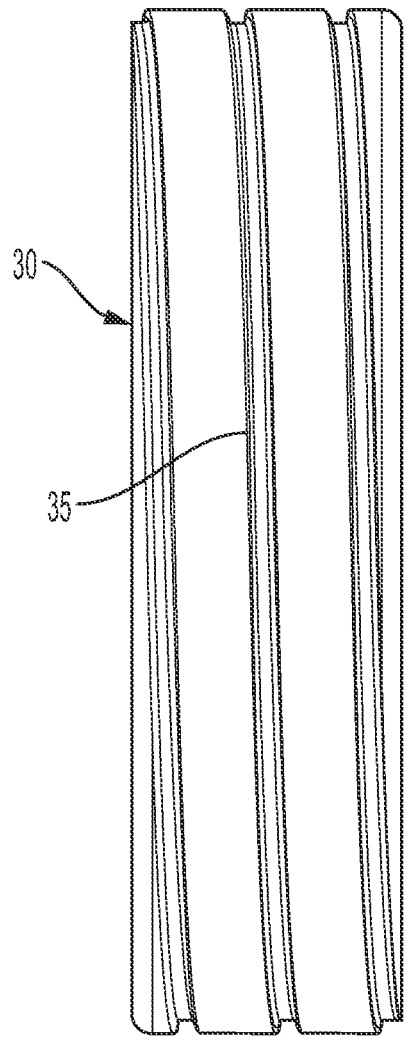
FIG. 2A is a side view of an outer ring of the bearing assembly.
Figure 2B:
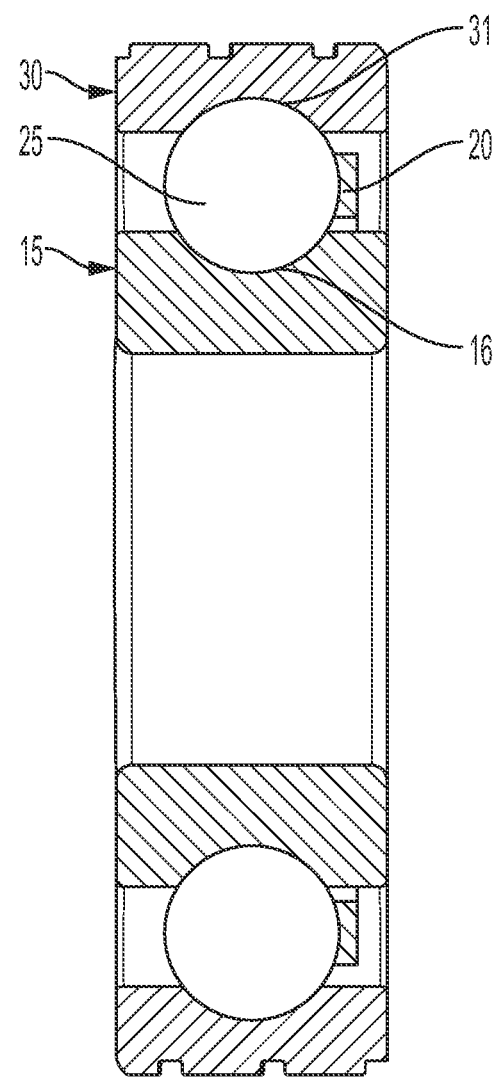
FIG. 2B is a cross-sectional view of the bearing assembly.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import. "Generally" or "approximately" refers to +/−10% of the indicated value.

Referring to FIG. 1, a bearing assembly 10 is disclosed. The bearing assembly 10 includes an inner ring 15, an outer ring 30, and a plurality of rolling elements 25 supported by a cage 20 that run on an inner raceway 16 defined by the inner ring 15 and an outer raceway 31 defined by the outer ring 30.

Figure 3A:
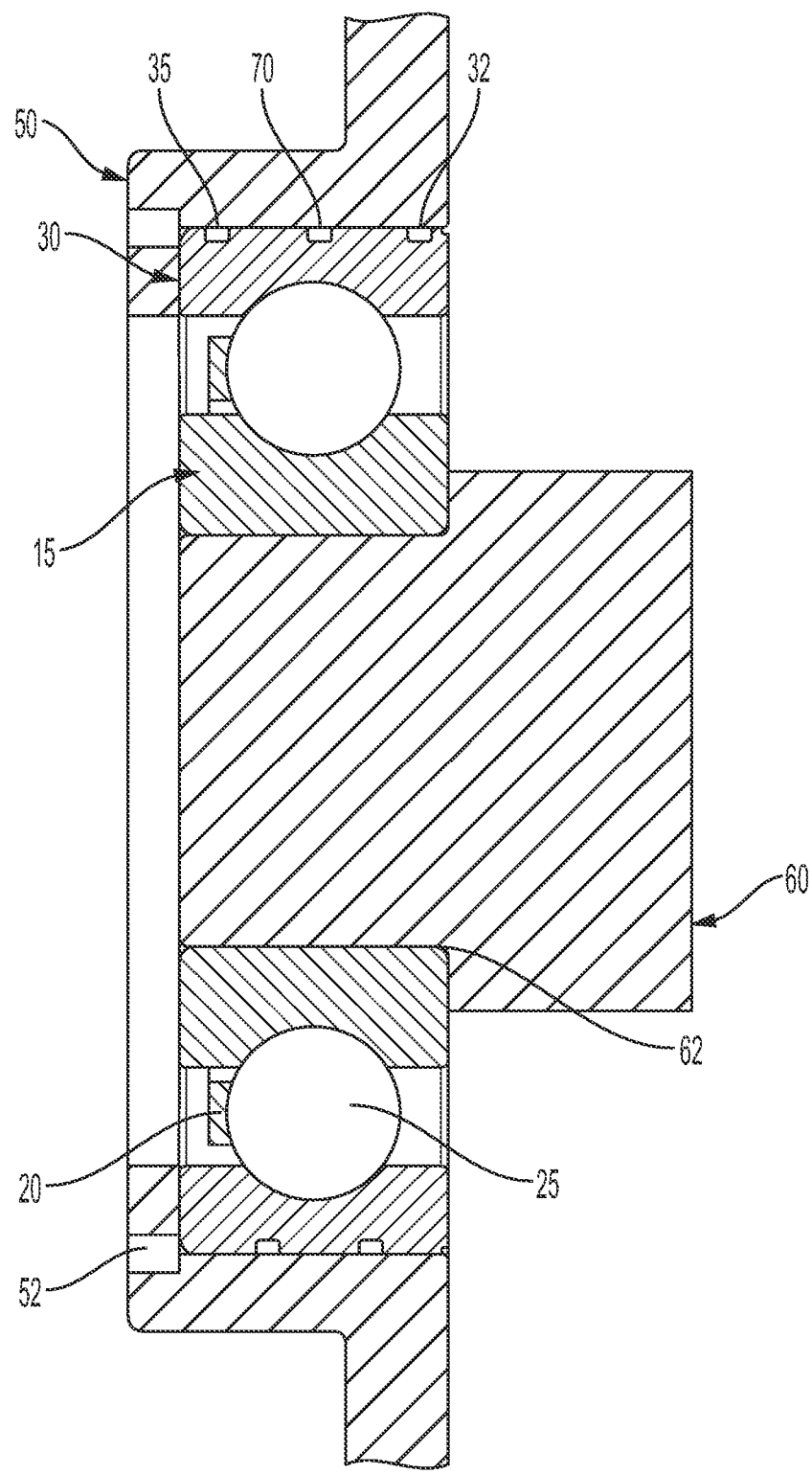
FIG. 3A is a cross-sectional view of a bearing assembly including an inner shaft and an outer housing.
Figure 3B:
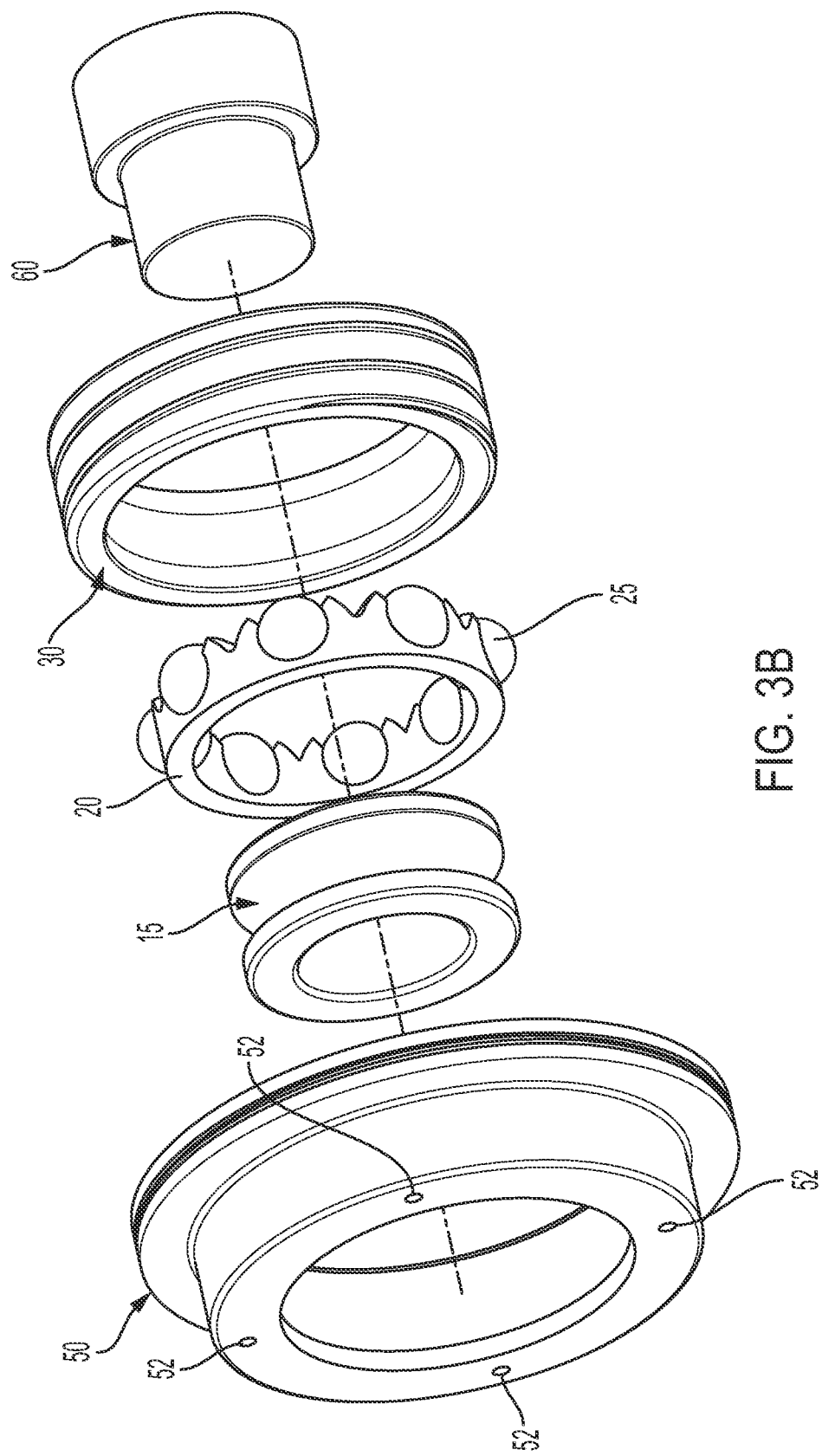
FIG. 3B is a perspective exploded view of the bearing assembly of FIG. 3A.
Figure 6:
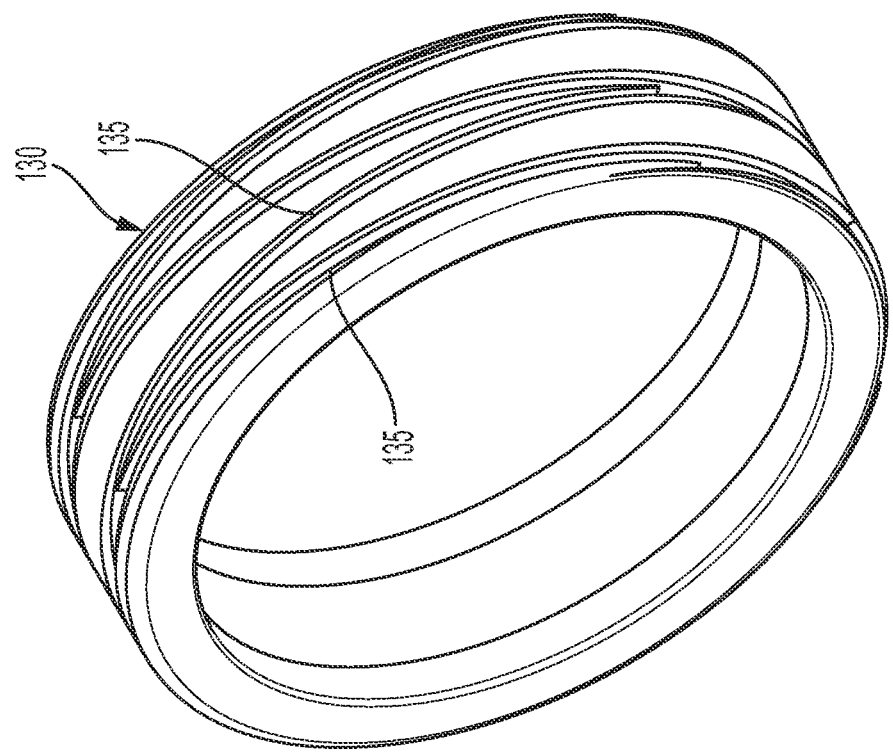
FIG. 6 is a perspective view of an outer ring according to another embodiment.
Figure 5:
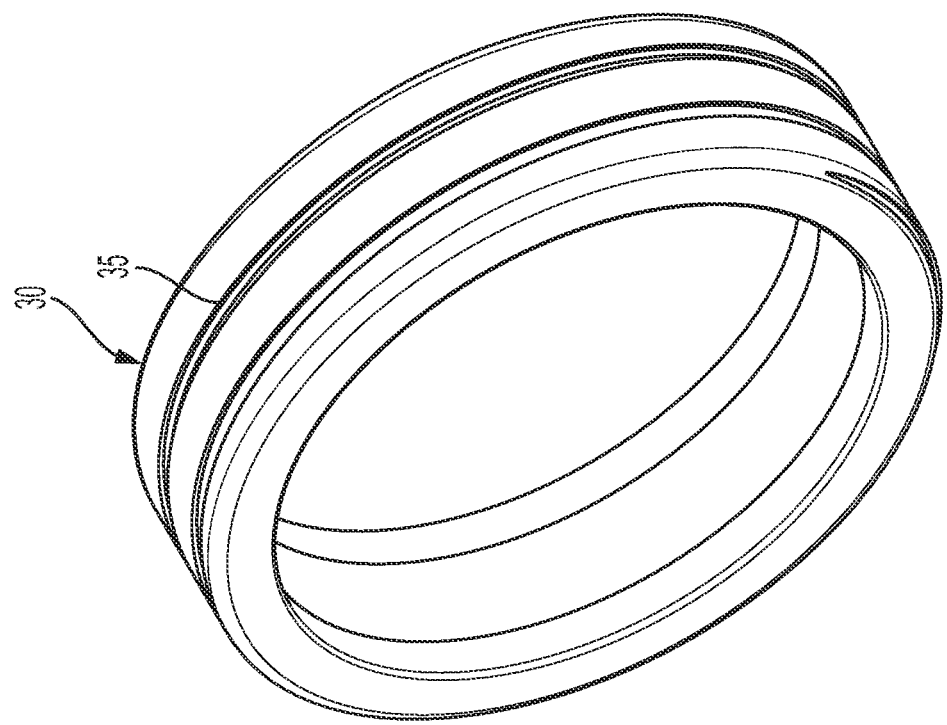
FIG. 5 is a perspective view of the outer ring of FIGS. 1-4C.

As shown in FIGS. 3A and 3B, the bearing assembly 10 can be used in conjunction with an outer housing 50 and a shaft 60. Specifically, the outer ring 30 can be arranged adjacent to the housing 50, and the inner ring 15 can be mounted on the shaft 60. Lubricant passages 52 can be defined on the housing 50 and can be configured to direct lubricant through the housing 50 to the interface defined between the housing 50 and the outer ring 30. The housing 50 is formed from metal, in one embodiment. In one aspect, the housing 50 is formed from aluminum. Clearance is defined between the housing 50 and the outer ring 30, depending on the operating condition and temperature of the housing 50. The outer ring 30 includes at least one groove 35.

Figure 12B:
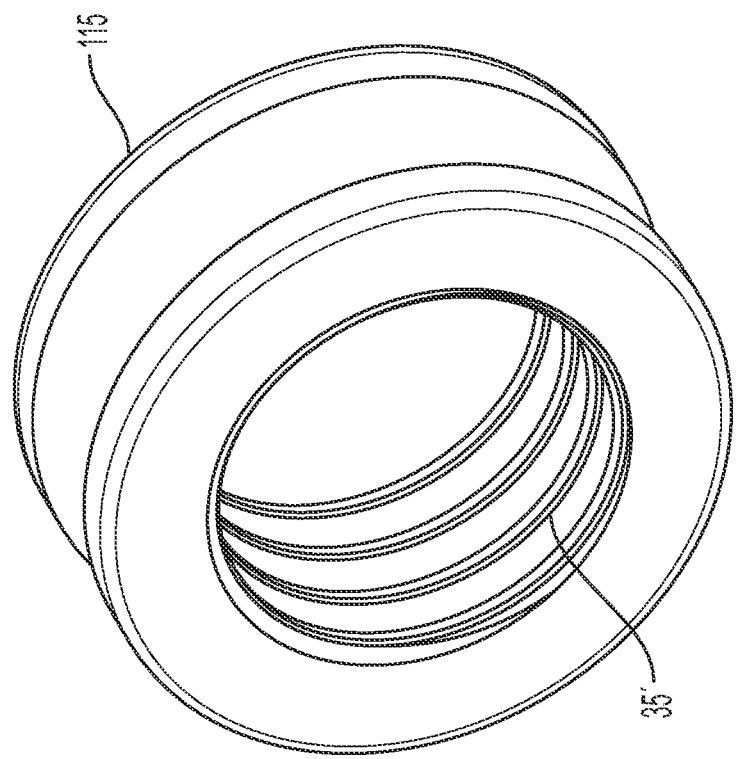
FIG. 12B is a perspective view of the inner ring of FIG. 12A.
Figure 12A:
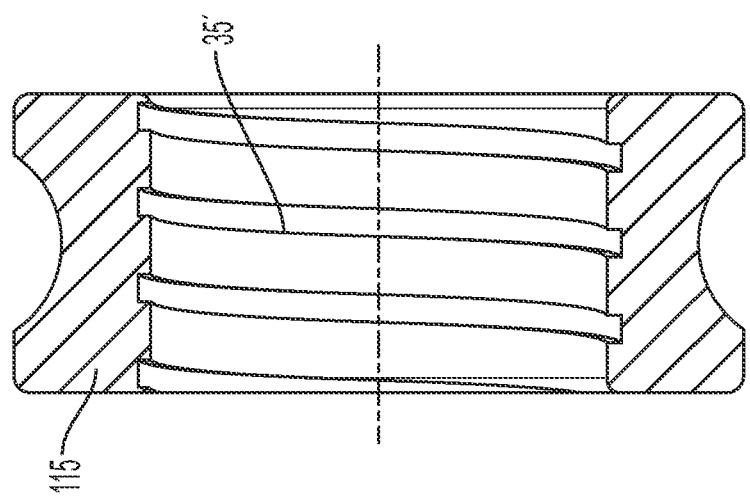
FIG. 12A is a side cross-sectional view of the inner ring according to one embodiment.

As shown in FIGS. 12A and 12B, the inner ring 115 can also include the at least one groove 35'. In this embodiment, the shaft 60 is similarly formed from metal, and can be formed from steel or aluminum. All aspects of the inner ring 115 and the at least one groove 35' are identical to the limitations described herein with respect to the groove 35 formed on the outer ring 30, unless specified otherwise.

The at least one groove 35 has a profile including lateral sides 36a, 36c, a base 36b extending between the lateral sides 36a, 36c, and edge breaks 37a, 37b connecting the lateral sides 36a, 36c to an outer surface 32 of the outer ring 30.

In one aspect, the groove 35 extends along the outer surface 32 of the outer ring 30 for at least one revolution. In one aspect, the groove 35 extends along the outer surface 32 of the outer ring 30 for two to eight revolutions.

The groove 35 has a width (W) that is larger than its depth (D), in one aspect. The groove 35 can have a width (W) of 1.0 mm-7.0 mm, in one aspect. The groove 35 has a width (W) of 4.0 mm in one embodiment.

The depth (D) of the groove 35 can be 50% of a thickness (T) of the outer ring 30. In one aspect, the depth (D) of the groove 35 is less than 50% of the thickness (T) of the outer ring 30. The depth (D) can be 1.0 mm-2.0 mm, in one embodiment.

The edge breaks 37a, 37b have a predetermined extent (E). The predetermined extent (E) is preferably 0.5-1.5 mm in one embodiment. The extent (E) is 1.0 mm in one embodiment. As shown in FIG. 4C, the extent (E) refers to a dimension defined on both the outer surface 32 and the lateral sides 36a, 36c.

In one embodiment, the edge breaks 37a, 37b include a protrusion or bump 39 in a medial region. As shown in FIG. 4C, the edge breaks 37a, 37b can have a profile having a first concave region 38a connected to the outer surface 32, a convex portion 38b adjacent to the first concave region 38a, and a second concave region 38c adjacent to the convex portion 38b that connects to the lateral side 36a, 36c. One of skill in the art would understand that the edge shape shown in FIG. 4C can vary.

The groove 35 provides a predetermined edge break configuration that optimizes its ability to prevent creep of the outer ring 30. The specific dimensions of the groove 35, and specifically the edge breaks 37a, 37b, are selected to ensure that the edge of the groove 35 is not sharp enough to cut into the housing 50, but also rough enough or defined enough to ensure that sufficient friction is generated between the housing 50 and the bearing ring 30 to prevent creep.

In one aspect, a method of forming the outer ring 30 is disclosed herein. The bearing ring 30 can be formed using hard-turning to form the groove 35 on the outer surface 32 of the outer ring 30. The method can include using brushes then to remove any burrs. Hard-turning to form the groove 35 provides an economical and cost-effective formation method.

Figure 8:
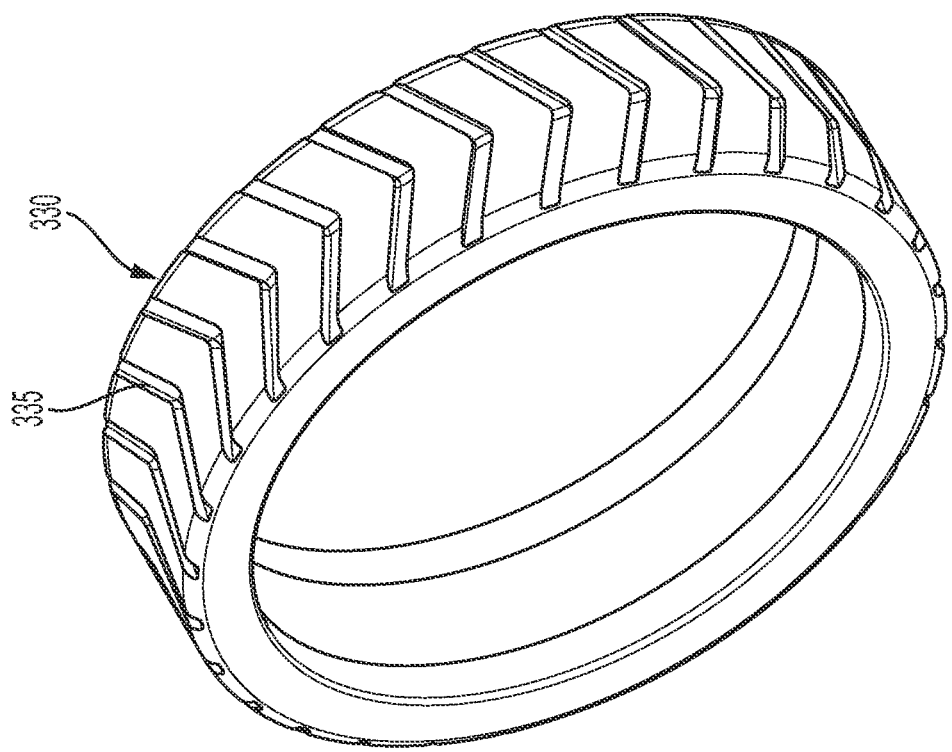
FIG. 8 is a perspective view of an outer ring according to another embodiment.
Figure 7:
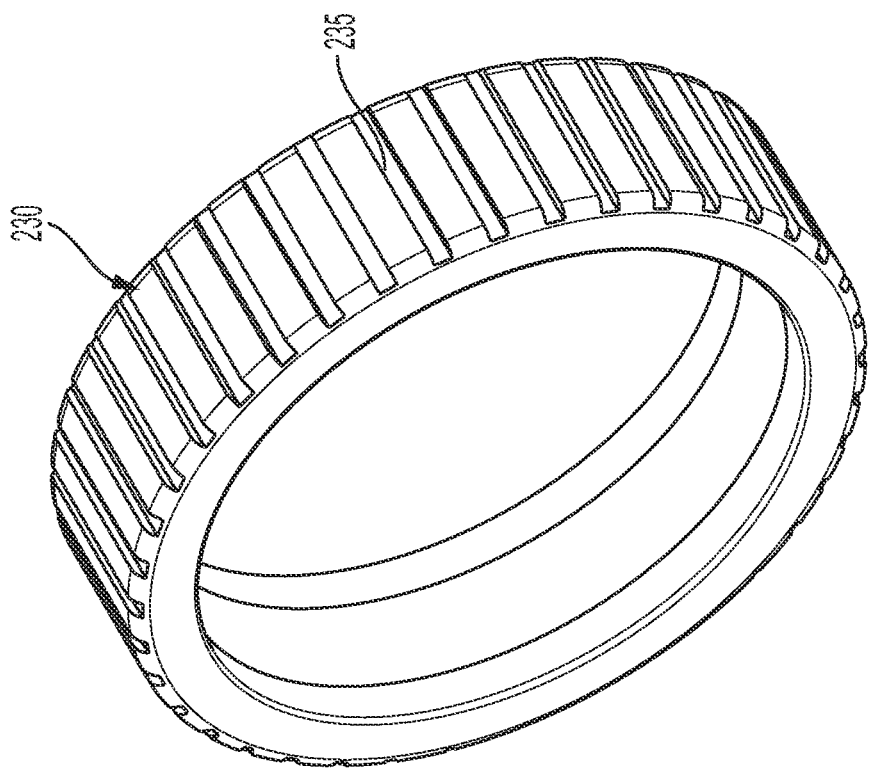
FIG. 7 is a perspective view of an outer ring according to another embodiment.
Figure 10:
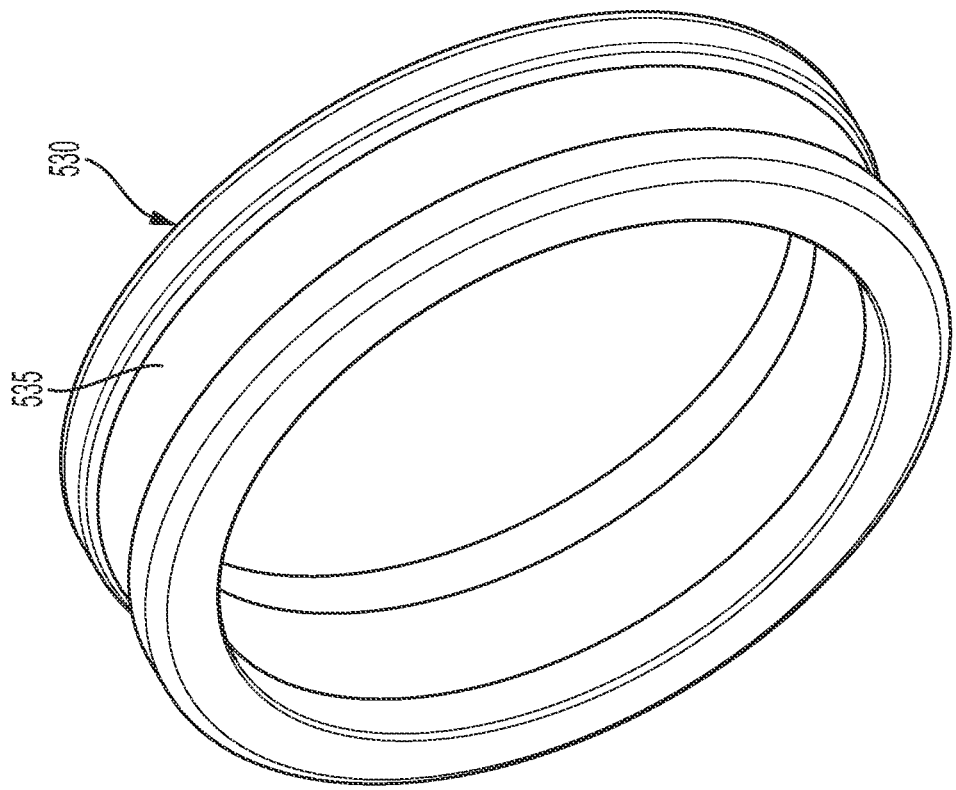
FIG. 10 is a perspective view of an outer ring according to another embodiment.
Figure 9:
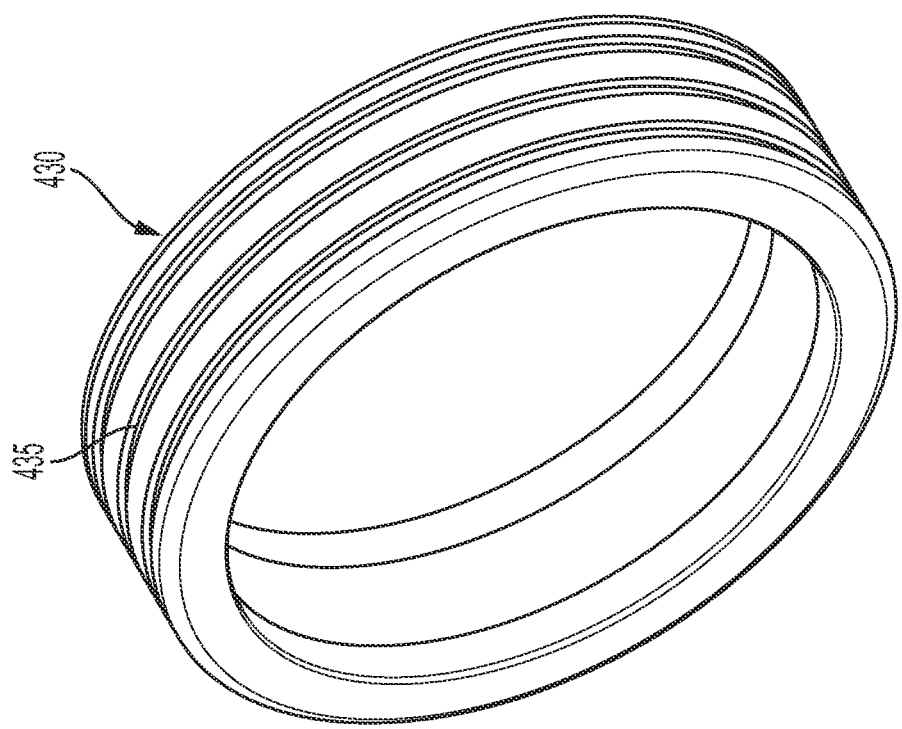
FIG. 9 is a perspective view of an outer ring according to another embodiment.

The general shape, orientation, and quantity of the at least one groove 35 can vary, as shown in FIGS. 5-10. The groove 35 in FIG. 5 corresponds to the configuration shown in FIGS. 1, 2A, 2B, 3A, 3B, and 4A-4C. The grooves 135 in FIG. 6 include two separate different grooves that are inclined towards each other and intersect to define a combined groove, i.e. a dual spiral groove. The groove 235 in FIG. 7 is an axially extending groove. In FIG. 8, the groove 335 is formed as a V-shaped groove. FIG. 9 illustrates parallel grooves 435. FIG. 10 illustrates a groove 535 having a relatively wider width compared to the groove 35 of FIG. 5. Each of the grooves in FIGS. 6-10 otherwise have the same characteristics (including the edge breaks) as the groove of FIGS. 1-5.

FIGS. 11A and 11B illustrate two different loading conditions for a bearing assembly. A spiral groove 35 and a parallel groove 435 are shown in the same drawings for illustrative purposes only. One skilled in the art would understand that an outer bearing ring would include either the spiral groove 35 or the parallel groove 435. A contact zone 70 is shown in FIGS. 11A and 11B. The contact zone 70 generally is defined in a region aligned with each loaded rolling element. The contact zone is generally defined between the housing and the bearing ring. Bearing loads generally pass through the rolling elements, then to the outer ring, and ultimately to the housing, in one embodiment. One skilled in the art would also understand that the loads can also be transferred from a radially outer component (i.e. housing) to the radially inner component (i.e. shaft) via the bearing assembly or vice versa. One skilled in the art would understand that contact zones are not continuous, and instead are aligned with each loaded rolling element.

Arranging or aligning the grooves 35, 435 (or any other groove disclosed herein) in a central area of the contact zone 70 optimizes the anti-creep functionality of the grooves 35, 435. In one aspect, as contact pressure increases between the housing and the bearing ring, the anti-creep effect is increased.

In one aspect, the spiral grooves 35 reduce creep to less than 0.005 RPM in a running condition. In one aspect, the spiral grooves 35 reduce creep to less than 0.001 RPM in a running condition. In one aspect, the spiral grooves 35 reduce creep by 99.99% as compared to a standard bearing without the spiral grooves. As used in this application, the term running condition refers to a state in which either of the bearing rings are experiencing rotation of at least 1,000 RPM in one aspect. In another aspect, the running condition refers to a rotational speed of 20,000 RPM.

The spiral groove 35 ensures adaptability to different loading cases. When the loading states change, the center of the contact zone 70 between the outer ring and the housing also changes. The spiral groove 35 ensures that the creep of the outer ring is limited and the spiral groove 35 remains in a central region of the contact zone 70. The spiral groove 35 also increases the edge length that extends through the contact zone 70 due to the angle of the spiral groove 35.

As disclosed herein, the grooves can be formed on the inner or outer bearing rings, and particularly are formed on the surfaces that interface with either a shaft, housing, or other supporting or supported component.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

Bearing assembly 10
Inner ring 15
Inner raceway 16
Cage 20
Rolling elements 25
Outer ring 30
Outer raceway 31
Outer surface 32
Groove 35
Lateral sides of groove 36a, 36c
Base of groove 36b
Groove edges 37a, 37b
Housing 50
Lubricant passages 52
Shaft 60
Shoulder 62
Contact zone 70

The invention claimed is:

1. A method for preventing creep of a bearing ring in a bearing assembly, the method comprising:
   providing a bearing ring including a radial surface having at least one groove, the at least one groove has a profile including lateral sides, a base extending between the lateral sides, and edge breaks connecting the lateral sides to the radial surface; and
   arranging the bearing ring inside of a housing or around a shaft;
   wherein the edge breaks of the bearing ring frictionally engage with the shaft or the housing to prevent creep of the bearing ring.

2. The method of claim 1, further comprising aligning the at least one groove with a contact zone defined between the bearing ring and the housing or the shaft.

3. The method of claim 1, wherein the edge breaks have an extent of 0.05 mm-0.15 mm.

4. The method of claim 1, wherein the edge breaks include a protrusion in a medial region of the edge breaks.

5. The method of claim 1, wherein the at least one groove has a depth that is less than 50% of a thickness of the bearing ring.

6. The method of claim 1, wherein the bearing ring is arranged inside of the housing, and the housing is formed from metal.

7. The method of claim 1, wherein the at least one groove is a spiral groove.

8. The method of claim 1, wherein creep of the bearing ring is less than 0.001 RPM during a running condition.

9. The method of claim 1, wherein the edge breaks each have a profile consisting of a first concave region connected to the outer surface, a convex portion adjacent to the first concave region, and a second concave region adjacent to the convex portion that connects to a respective one of the lateral sides.

10. The method of claim 1, wherein the step of providing the bearing ring includes forming the at least one groove of the bearing ring via hard turning.

11. A bearing assembly comprising:
    a bearing ring including a radial surface including at least one groove, the at least one groove having a profile comprising lateral sides, a base extending between the lateral sides, and edge breaks connecting the lateral sides to the outer surface, the at least one groove having a width, and the edge breaks having an extent, wherein the extent of the edge breaks is 0.05 mm-0.15 mm.

12. The bearing assembly of claim 11, further comprising a shaft arranged inside of the bearing ring or a housing arranged outside of the bearing ring.

13. The bearing assembly of claim 12, wherein the at least one groove overlaps with a contact zone between the bearing ring and the housing.

14. The bearing assembly of claim 12, wherein the housing or the shaft is formed from aluminum.

15. The bearing assembly of claim 12, wherein clearance is provided between the bearing ring and the housing or the shaft.

16. The bearing assembly of claim 11, wherein the edge breaks include a protrusion in a medial region of the edge breaks.

17. The bearing assembly of claim 11, wherein the edge breaks have a profile consisting of a first concave region connected to the outer surface, a convex portion adjacent to the first concave region, and a second concave region adjacent to the convex portion that connects to a respective one of the lateral sides.

18. The bearing assembly of claim 11, wherein creep of the bearing ring is limited to less than 0.001 RPM during a running condition.

19. The bearing assembly of claim 11, wherein the at least one groove of the bearing ring is formed via hard turning.

20. The bearing assembly of claim 11, wherein the at least one groove includes two grooves that are inclined relative to each other.

21. The bearing assembly of claim 11, wherein the at least one groove is a spiral groove.

\* \* \* \* \*